(12) United States Patent
Hanko et al.

(10) Patent No.: US 12,487,222 B2
(45) Date of Patent: Dec. 2, 2025

(54) METHOD FOR DETERMINING A CHEMICAL INTAKE CAPACITY OF A PROCESS MEDIUM IN A MEASURING POINT AND MEASURING POINT FOR DETERMINING A CHEMICAL INTAKE CAPACITY OF A PROCESS MEDIUM

(71) Applicant: Endress+Hauser Conducta GmbH+Co.KG, Gerlingen (DE)

(72) Inventors: Michael Hanko, Dresden (DE); Erik Hennings, Freiberg (DE)

(73) Assignee: Endress+Hauser Conducta GmbH+Co. KG, Gerlingen (DE)

( * ) Notice: Subject to any disclaimer, the term of this patent is extended or adjusted under 35 U.S.C. 154(b) by 643 days.

(21) Appl. No.: 16/942,439

(22) Filed: Jul. 29, 2020

(65) Prior Publication Data

US 2021/0033590 A1   Feb. 4, 2021

(30) Foreign Application Priority Data

Jul. 29, 2019 (DE) .................... 10 2019 120 415.1

(51) Int. Cl.
*G01N 1/20* (2006.01)
*G01N 27/06* (2006.01)
(Continued)

(52) U.S. Cl.
CPC ....... *G01N 33/1893* (2013.01); *G01N 1/2035* (2013.01); *G01N 33/1813* (2013.01); *G01N 33/182* (2013.01); *G01N 2001/205* (2013.01)

(58) Field of Classification Search
CPC ............. G01N 33/1893; G01N 1/2035; G01N 33/1813; G01N 33/182; G01N 2001/205;
(Continued)

(56) References Cited

U.S. PATENT DOCUMENTS

| | | | | |
|---|---|---|---|---|
| 3,904,365 A | * | 9/1975 | Larson | G01N 31/16 324/439 |
| 4,859,422 A | * | 8/1989 | Qureshi | G01N 35/085 436/52 |
| 5,270,218 A | * | 12/1993 | Ikeda | G01N 33/2888 422/68.1 |
| 5,643,799 A | | 7/1997 | Atwater et al. | |
| 6,936,156 B2 | * | 8/2005 | Smith | G01N 33/18 205/789 |

(Continued)

FOREIGN PATENT DOCUMENTS

| | | | |
|---|---|---|---|
| CN | 107449926 A | 12/2017 | |
| DE | 2341709 A1 | 2/1974 | |
| WO | WO-2012012834 A1 * | 2/2012 | ............. C02F 1/008 |

*Primary Examiner* — Elizabeth A Robinson
*Assistant Examiner* — Brittany I Fisher
(74) *Attorney, Agent, or Firm* — Kelly J. Smith; Endress+Hauser (USA) Holding, Inc.

(57) ABSTRACT

A method for determining a chemical intake capacity of a process medium includes steps of providing a measuring point and an analytical measuring device, closing an outlet valve to the drain so that no process medium is discharged and closing the inlet valve so that no additional process medium is fed from the first inlet. The method includes circulating the analyte and process medium through the pump so the mixture flows into the analytical measuring device at a predetermined flow velocity. Further, the method includes detecting a measured value using the analytical measuring device until the measured value exceeds a limit value. The predetermined volumes are summed to form a total volume of the analyte, and a chemical intake capacity of the predetermined medium is determined based on the total volume of the analyte fed in.

9 Claims, 2 Drawing Sheets

(51) Int. Cl.
*G01N 27/30* (2006.01)
*G01N 27/416* (2006.01)
*G01N 33/18* (2006.01)
*G01N 35/10* (2006.01)
G01N 27/333 (2006.01)
G01N 27/42 (2006.01)
G01N 27/48 (2006.01)

(58) Field of Classification Search
CPC .. G01N 35/1097; G01N 27/302; G01N 27/06; G01N 27/304; G01N 27/333; G01N 27/416; G01N 27/4163; G01N 27/4165; G01N 27/423; G01N 27/48
See application file for complete search history.

(56) References Cited

U.S. PATENT DOCUMENTS

| | | | |
|---|---|---|---|
| 2002/0151080 A1 | 10/2002 | Dasgupta et al. | |
| 2004/0023405 A1 | 2/2004 | Bevan et al. | |
| 2008/0314450 A1* | 12/2008 | Hawker | B08B 9/032 422/68.1 |
| 2009/0057145 A1* | 3/2009 | Vincent | G01N 27/4168 204/401 |
| 2016/0167992 A1* | 6/2016 | Alber | G05B 19/042 700/283 |
| 2016/0223509 A1* | 8/2016 | Caradec | G01N 33/18 |
| 2017/0102370 A1* | 4/2017 | Alber | G01N 33/18 |
| 2017/0138853 A1* | 5/2017 | Konishi | G01N 21/274 |
| 2017/0168011 A1* | 6/2017 | Miyamura | G01N 27/301 |
| 2017/0285054 A1* | 10/2017 | Muz | G01N 35/00623 |
| 2019/0064062 A1 | 2/2019 | Wang et al. | |

* cited by examiner

METHOD FOR DETERMINING A CHEMICAL INTAKE CAPACITY OF A PROCESS MEDIUM IN A MEASURING POINT AND MEASURING POINT FOR DETERMINING A CHEMICAL INTAKE CAPACITY OF A PROCESS MEDIUM

The invention relates to a method for determining a chemical intake capacity of a process medium in a measuring point, a method for determining a disinfectant requirement of a process medium and a measuring point for determining a chemical intake capacity of a process medium.

In analytical measurement technology, especially in the fields of water management and environmental analysis and in industry, for example in food technology, biotechnology and pharmaceuticals, as well as for various laboratory applications, measurands such as pH value, conductivity or the concentration of analytes such as ions or dissolved gases in a gaseous or liquid measurement medium are vitally important. These measurands can be detected and/or monitored, for example, by means of analytical measuring devices, especially electrochemical sensors, such as potentiometric, amperometric, voltammetric or coulometric sensors, or else conductivity sensors.

In the field of water management, especially in the monitoring of drinking water, ballast water in ships, water in swimming pools, so-called disinfection sensors are used, which are suitable for measuring different parameters, e.g. chlorine, chlorine dioxide, bromine, hydrogen peroxide, etc. Such sensors are used when the content of the respective species has to be monitored in order to ensure an antibacterial state of the process systems.

Disinfection sensors also show a dependence of the measured value on the inflow of the sensor membrane. For reliable measurement results, it is therefore important to know the inflow and to be able to set it precisely.

Disinfection sensors are usually part of a measuring point or even of a control loop. Measuring points can be designed, for example, as flow fittings or as screw-in nozzles. Flow fittings are preferred over screw-in nozzles, since the flow at the sensor membrane can be set with these.

To date, disinfection sensors have been regulated to a specific concentration of a disinfecting medium, in order to realize a uniform disinfection.

However, this type of control does not account for the depletion rate of the disinfecting medium used in the process medium. The depletion rate is understood to mean the speed of the depletion or consumption of disinfecting medium in the process medium. In the case of conventional regulation of the disinfecting medium, overdosing of disinfectant can thus result, which causes additional costs for disinfectant.

In the dosing of acids and alkalis, media frequently have a buffer capacity. In this context, buffer capacity is understood to mean the amount of acid or alkali which can be absorbed by a medium without any substantial change in the pH value. To date, determining the buffer capacity of a process medium with a measuring point installed in a process without removing the sensor has not been known.

In a complexometric titration, such as, for example, a hardness determination, the different formation of colored complexes is determined. The intake capacity of a medium up to a color change is determined. Determining the intake capacity of a process medium with a measuring point installed in a process without removing the sensor has not been known so far.

An object of the invention is thus to determine the chemical intake capacity of a process medium.

This object is achieved by a method for determining a chemical intake capacity of a process medium in a measuring point.

The method according to the invention comprises at least steps of providing a measuring point through which a process medium flows and an analytical measuring device, wherein the measuring point has an inlet valve, an outlet valve, an analysis container, a dosing container and a pump. The inlet valve is connected to a first inlet, for feeding in the process medium, a second inlet for feeding in an analyte, the analysis container and the dosing container. The outlet valve is connected to a drain, the analysis container and the dosing container. The inlet valve, the analysis container, the dosing container and the outlet valve are connected to one another in such a way that a flow circuit can be realized in the measuring point. The pump is arranged in such a way that it is suitable for generating the flow circuit, the analytical measuring device is arranged in the analysis container and is in contact with the process medium. The outlet valve is closed to that no process medium is discharged through the outlet valve to the outlet, and the inlet valve is closed so that no additional process medium is fed from the first inlet into the measuring point and a predetermined volume of process medium is located in the measuring point. The method also includes steps of feeding a predetermined volume of the analyte into the measuring point through the inlet valve from the second inlet and circulating the analyte and the process medium through the pump, so that the flow circuit is generated and an analyte process medium mixture flows into the analytical measuring device. A predetermined flow velocity of the analyte process medium mixture is set by the pump. Additional method steps include detecting a measured value using the analytical measuring device, comparing the measured value with a limit value, and repeating the steps of feeding, circulating, detecting and comparing if the measured value does not exceed the limit value until the measured value exceeds the limit value. The fed-in predetermined volumes are summed to form a total volume of the analyte, and a chemical intake capacity of the process medium based on the total volume of the analyte fed in is determined.

The method according to the invention for determining a chemical intake capacity of a process medium of a disinfectant optimizes the consumption of disinfecting medium and the disinfecting effect.

According to one embodiment of the invention, the limit value is a disinfectant content and the analytical measuring device is a disinfection sensor.

According to one embodiment of the invention, the limit value is a depletion rate of a disinfectant, and the step of detecting a measured value comprises detecting a pair of measured values having a first measured value and a second measured value.

According to one embodiment of the invention, there is a time interval between the detection of the first measured value and the second measured value, preferably less than 10 minutes, especially preferably less than 1 minute.

In one embodiment of the invention, the steps of feeding, circulating and detecting the first measured value occur simultaneously or within a time interval of less than 1 minute, especially preferably less than 10 seconds.

The object according to the invention is further achieved by a method for determining a disinfectant requirement of a process medium according to claim 6.

The method according to the invention comprises steps of determining a chemical intake capacity of a process medium in a measuring point according to the method according to the invention for determining a chemical intake capacity of a process medium in a measuring point. The method also includes calculating a disinfectant requirement based on the sum of the fed-in volumes of disinfectant and a total volume of process medium or a volumetric flow of process medium, and feeding the calculated amount of disinfectant into the measuring point through the inlet valve from the second inlet while the process medium flows from the first inlet through the measuring point to the drain.

The object according to the invention is further achieved by a measuring point for determining a chemical intake capacity of a process medium.

The measuring point according to the invention comprises an inlet valve, an outlet valve, an analysis container, a dosing container, and a pump with a regulatable delivery rate. The inlet valve is connected to a first inlet for feeding in a process medium, a second inlet for feeding in an analyte, the analysis container and the dosing container. The outlet valve is connected to a drain, the analysis container and the dosing container. The inlet valve, the analysis container, the dosing container and the outlet valve are connected to one another in such a way that a flow circuit can be realized in the measuring point. The pump is arranged in such in such a way that it is suitable for generating the flow circuit. The analytical measuring device is arranged in the analysis container in such a way that the flow circuit can flow into the analytical measuring device According to one embodiment of the invention, the measuring point further comprises a bypass channel which connects the first inlet and the drain in order to guide a part of the process medium from the first inlet past the analysis container and the dosing container to the drain, wherein a first drive means of the pump is arranged in the bypass channel and a second drive means of the pump is arranged in the flow circuit, wherein the first drive means is suitable for driving the second drive means.

According to one embodiment of the invention, the inlet valve is configured as a multi-way valve.

According to one embodiment of the invention, the analytical measuring device is an electrochemical chlorine sensor and/or an electrochemical chlorine dioxide sensor and/or a bromine sensor and/or a pH sensor and/or a conductivity sensor and/or a dissolved oxygen sensor.

The invention is explained in more detail on the basis of the following description of the figure.

The following are shown:

Figure 1:
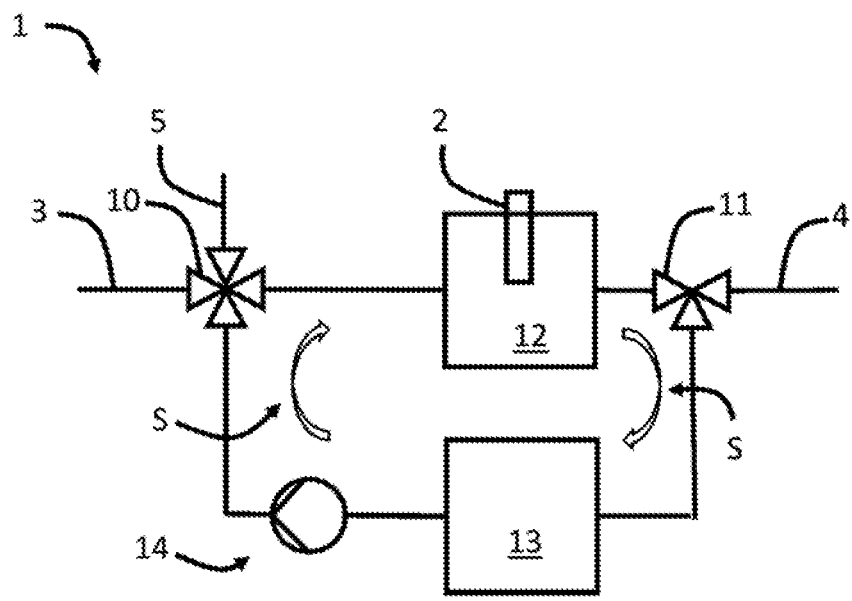
FIG. 1 is a schematic depiction of a measuring point according to the invention.

FIG. 1 shows a schematic depiction of a measuring point 1 according to the invention. According to one embodiment, the measuring point 1 is a flow-through measuring point. The measuring point 1 comprises an inlet valve 10, an outlet valve 11, an analysis container 12, a dosing container 13 and a pump 14. An analytical measuring device 2 is arranged in the analysis container 12.

The inlet valve 10 is connected to a first inlet 3 for feeding in a process medium, a second inlet 5 for feeding in an analyte, the analysis container 12 and the dosing container 13.

The outlet valve 11 is connected to a drain 4, the analysis container 12 and the dosing container 13. The inlet valve 10 is preferably configured as a multi-way valve, for example as a four-way valve. In one embodiment, the inlet valve 10 can be designed in such a way that the four paths of the inlet valve 10 are arranged in a manner spatially separated.

The inlet valve 10, the analysis container 12, the dosing container 13 and the outlet valve 11 are connected to one another in such a way that a flow circuit S can be realized in the measuring point 1. The pump 14 is arranged in such a way that it is suitable for generating the flow circuit S. In FIG. 1, the pump 14 is arranged between the inlet valve 10 and the dosing container 13. However, the pump 14 can also be arranged at other points within the flow circuit S. The pump 14 has a regulatable delivery rate. The analytical measuring device 2 is arranged in the analysis container 12 in such a way that the flow circuit S can flow into the analytical measuring device 2.

The analytical measuring device 2 is, for example, a chlorine sensor and/or a chlorine dioxide sensor and/or a bromine sensor and/or a pH sensor and/or a conductivity sensor and/or a dissolved oxygen sensor.

Figure 2:
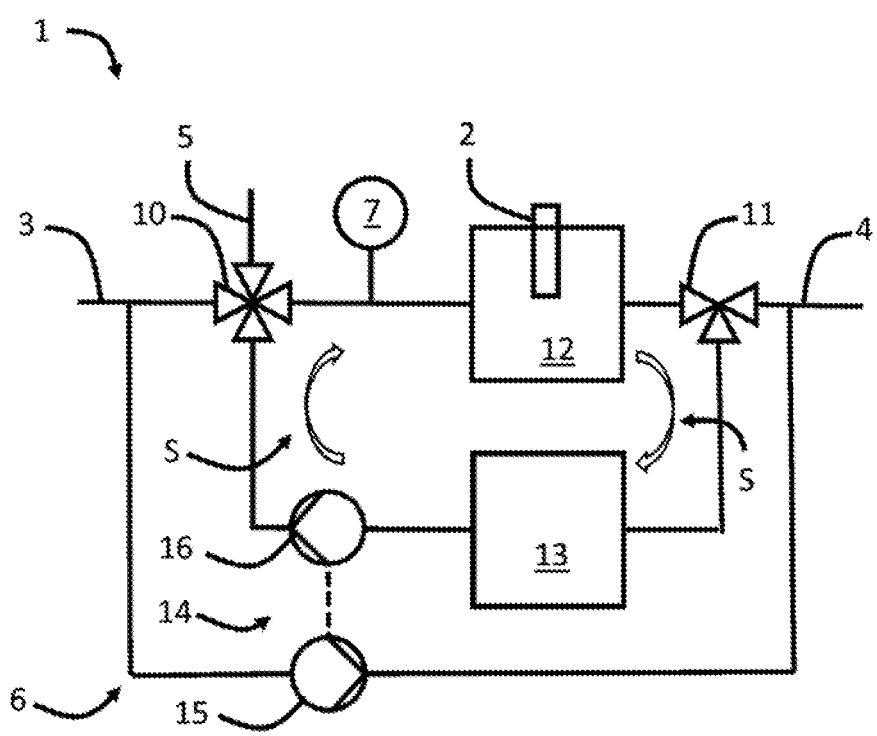
FIG. 2 is a schematic depiction of an embodiment of the measuring point from FIG. 1 with a bypass channel.

FIG. 2 shows a second embodiment of the measuring point 1 with a so-called bypass channel 6. The bypass channel 6 connects the first inlet 3 and the drain 4, in order to guide the process medium from the first inlet 3 to the drain 4. The bypass channel 6 enables a portion of the process medium to be guided from the first inlet 3 past the analysis container 12 and the dosing container 13 directly to the drain 4. A first drive means 15 of the pump 14 is arranged in the bypass channel 6 and a second drive means 16 of the pump is arranged in the flow circuit S. The first and second drive means 15, 16 is, for example, a paddle wheel or a turbine type. The first drive means 15 is suitable for driving the second drive means 16. The first drive means 15 is connected to the second drive means 16 via a drive shaft, for example. A transmission means, for example a transmission, can also be arranged between the first drive means 15 and the second drive means 16, in order to achieve different rotational speeds of the two drive means 15, 16.

FIG. 2 further shows a flow meter 7 arranged between the inlet valve 10 and the analysis container 12. The flow meter 7 can, of course, be arranged at other positions in the flow circuit S. The flow meter 7 enables a flow velocity to be measured. Of course, the flow meter 7 can also be used in the measuring points 1 depicted in FIG. 1 or FIG. 3 (not shown there). Alternatively or additionally, the pump 14 can be used to measure the flow velocity.

Figure 3:
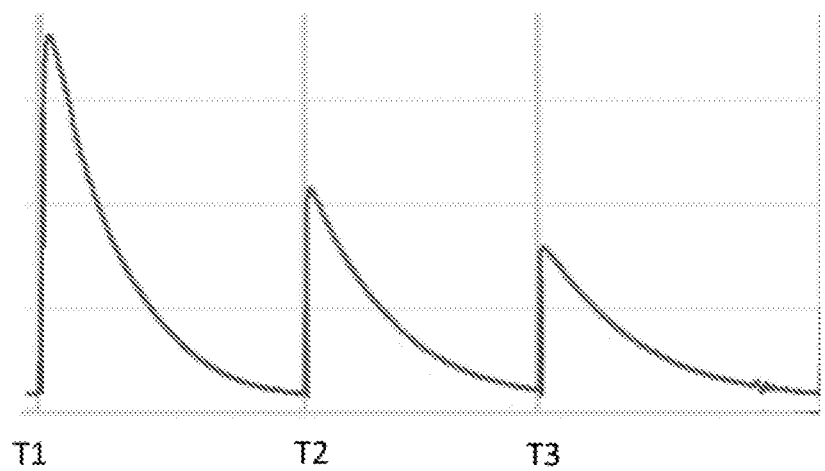
FIG. 3 is a schematic depiction of the depletion of a disinfectant.

FIG. 3 shows a schematic curve of a concentration of a disinfectant dissolved in the process medium enclosed in the measuring point 1. In other words, a curve of a depletion of a disinfectant is depicted. At points in time T1-T3, disinfectant is introduced into the measuring point 1 at various concentrations through the second inlet 5. Saturation of the process medium enclosed in the measuring point 1 is not achieved in this case, since the disinfectant is almost completely broken down or has converted after each introduction. In the case of saturation, the concentration would no longer decrease; rather, it would remain virtually at a constant level regardless of time. Saturation of the process medium enclosed in the measuring point corresponds to a maximum intake capacity of disinfectant of the process medium. In other words, a depletion curve with a slope equal to zero corresponds to the maximum intake capacity of disinfectant. A further addition of disinfectant would cause a further increase in the disinfectant concentration and mean an oversaturation of the process medium, which is in principle to be avoided.

In the following, a method for determining a chemical intake capacity of a process medium in a measuring point is described.

In a first step, the measuring point 1 described above with reference to FIG. 1 is provided.

The measuring point 1 is provided in such a way that the process medium flows through the measuring point 1. In other words, the measuring point 1 is in operation. The process medium thus flows from the first inlet 3 through the measuring point 1 to the drain 4. In other words, the measuring point 1 is in a measuring mode here, in order to measure a parameter of the process medium.

The process medium is guided from the first inlet 3 through the analysis container 12 to the outlet 4. In this case, the inlet valve 10 is switched in such a way that the inlet valve 10 communicates with the first inlet 3 and the analysis container 12, and the outlet valve 11 is switched in such a way that the outlet valve 11 communicates only with the analysis container 12 and the outlet 4.

In a next step, the outlet valve 11 is closed, so that no process medium is discharged through the outlet valve 11 to the drain 4. Thus, capacity-determining operation for determining the chemical intake capacity of a process medium can be performed.

The inlet valve 10 is then closed, so that no additional process medium is fed from the first inlet 3 into the measuring point 1. This means that a predetermined amount of process medium is located between the inlet valve 10 and the outlet valve 11.

The step of closing the outlet valve 11 can also be performed after the step of closing the inlet valve 10, so that a predetermined amount that is less than the maximum amount of process medium receivable by the measuring point is contained or enclosed in the measuring point.

Optionally, before the step of closing the outlet valve 11 and closing the inlet valve 10, a step of measuring the process medium using the analytical measuring device 2 and a step of measuring the flow velocity of the process medium using a flow meter 7 can be performed.

FIG. 2 shows at point in time T1 the following exemplary step, namely feeding a predetermined volume of disinfectant into the measuring point 1 through the second inlet 5 of the inlet valve 10. Generally speaking, of course, instead of the disinfectant, an analyte with respect to which the chemical intake capacity of the process medium enclosed in the measuring point is to be determined can be fed in. Thus, for example, a pH buffer capacity, a precipitant dosage, a complexing agent dosage or the disinfectant intake capacity can be determined with regard to the process medium.

The disinfectant used is, for example, chlorine dioxide, free chlorine, free bromine, hydrogen peroxide, peracetic acid or ozone.

Next, the disinfectant, or the analyte, and the process medium are circulated, i.e. mixed, through the pump 14, so that the flow circuit S is generated and the disinfectant process medium mixture or an analyte process medium mixture flows into the analytical measuring device 2. Here, a predetermined flow velocity is set by the pump 14. When reference is made hereinafter by way of example to disinfectant process medium mixture, a mixture with other analytes than the disinfectant, i.e. generally speaking an analyte process medium mixture, is of course also understood.

The predetermined flow velocity of the disinfectant process medium mixture is preferably set in such a way that the flow velocity of the disinfectant process medium mixture corresponds to the flow velocity of the process medium measured by the flow meter. Accurate calibration is thus possible, since the operating conditions of the analytical measuring device 2, i.e. the exact flow speed, of the measuring operation are also taken into account during disinfection operation.

As indicated in FIG. 1 by the arrows, the flow circuit S runs clockwise from the analysis container 12, via the inlet valve 10, via the pump 14, via the dosing container 13, via the outlet valve 11 to the analysis container 12. Thus, the flow circuit S has the same flow direction as the process medium in a measuring operation. The process medium advantageously flows into the analytical measuring device 2 in the same way. The inlet valve 10 and the outlet valve 11 are opened in such a way that the analysis container 12 and the dosing container 13 communicate with each other in fluid communication.

In a next step, the analytical measuring device 2 detects a measured value. The measured value is, for example, disinfectant content, the pH value of the process medium, or a measured value characterizing the precipitant dosage or complexing agent dosage.

In one variant, the detection of the measured value comprises detecting a pair of measured values having a first measured value and a second measured value.

Preferably, there is a time interval between the steps of detecting the first measured value and the second measured value. This time interval is preferably less than 10 minutes, especially preferably less than 1 minute. The time interval is in each case more than 1 second.

The steps of feeding, circulating and detecting the first measured value preferably occur simultaneously or during a time interval of less than 1 minute, especially preferably less than 30 seconds. A determination of the first measured value close to the time of the step of feeding and a determination of the second measured value close to the time for determining the first measured value enables a rapid determination of the depletion rate of the disinfectant.

The detected measured value is then compared with a limit value. Depending on the analyte and the analytical measuring device, a specific limit value can be established. In an analytical measuring device for the disinfection measurement of the process medium, the limit value is, for example, the saturation of the process medium with disinfectant. The limit value is, for example, the depletion rate of disinfectant of a process medium, for example a depletion rate of zero. In the case of an analytical measuring device as a pH sensor, the limit value is, for example, a predetermined pH value, for example pH=7.

If the measured value has not exceeded/fallen below the specific predetermined limit value, the above-mentioned steps are repeated: feeding a predetermined volume of the analyte into the measuring point 1; circulating the analyte and the process medium, detecting the measured value or at least one further measured value; and comparing the measured value or the further measured value with the limit value.

At each repetition, the predetermined volumes of the volumes fed into the measuring point 1 are summed to form a total volume of the analyte fed in.

If, after multiple repetitions, the measured value has reached or exceeded/fallen below the limit value, the steps are no longer repeated.

Next, based on the total volume of analyte fed in, the chemical intake capacity of the process medium enclosed in the measuring point is determined.

In the embodiment in which the analyte is a disinfectant, the depletion rate of the disinfectant is determined based on the first measured value and the second measured value.

The depletion rate provides information about the disinfection state of the process medium located in the measuring point 1. The depletion rate of the disinfectant can then be used to determine the disinfectant requirement of the process medium. For this purpose, the depletion rate of the disinfectant is determined, as described above.

In this embodiment, the steps of feeding a predetermined volume of the disinfectant into the measuring point 1, circulating the disinfectant through the pump 14, detecting a first measured value, detecting a second measured value, and comparing the measured value with the limit value are repeated until the depletion rate of the disinfectant is equal to zero. Here, the comparison with the limit value means that if the depletion rate of the disinfectant is not zero, the limit value has not yet been reached.

FIG. 3 shows an example in which disinfectant is repeatedly fed into the measuring point 1 at point in time T2 and T3.

A depletion rate which is equal to "zero" is understood in this context to mean that the measured value difference between the first measured value and the second measured value is negligible. This is the case, for example, when the process medium is completely "germ-free" and in which the disinfectant is not broken down. No further dosage of disinfectant is thus required and additional disinfectant can be dispensed with.

Next, the disinfectant requirement can be calculated based on the sum of the volumes of disinfectant fed in and the total volume of process medium. This results in a volume of disinfectant necessary, in order to disinfect a certain volume of process medium, for example a swimming pool. Alternatively, the disinfectant requirement for a volumetric flow of process medium flowing through the measuring point can be calculated in order, for example, to enrich a drinking water line with disinfectant.

Based on the disinfectant requirement, a process medium flowing through the measuring point 1 can then be disinfected optimally, i.e. with minimal disinfectant consumption.

For this purpose, the disinfectant requirement must first be determined, as described above.

The inlet valve 10 and the outlet valve 11 are then opened, so that the process medium flows through the measuring point 1.

Next, a volumetric flow of the process medium flowing through the measuring point 1 is measured by a flow meter 7.

In a further step, a predetermined volume of disinfectant is added through the second inlet 5 of the inlet valve 10 as a function of the previously determined disinfectant requirement and the previously determined volumetric flow. An optimum amount of disinfectant is thus supplied to the process medium flowing through the measuring point 1. This minimizes the consumption of disinfectant and thus optimizes the disinfection of the process medium. For example, a minimal volume of disinfectant can be added to a drinking water supply line with a certain volumetric flow.

Alternatively, the determined disinfectant requirement can be converted for a total volume of a process medium, for example in a swimming pool, in order to determine the necessary volume of disinfectant. This volume of disinfectant can then be supplied to the swimming pool by a user of a disinfection system.

FIG. 2 shows a variant of the calibration method described with reference to FIG. 1. In this case, the first drive means 15 of the pump 14 is driven by the second drive means 16 of the pump 14 during the step of circulating the calibration medium process medium mixture. The flow velocity of the calibration medium in the flow circuit S is set here by setting a transmission ratio of the first drive means 15 and second drive means 16 which are mechanically connected to one another. In this variant, the flow meter 7 is used to check the flow velocity in the flow circuit S.

The invention claimed is:

1. A method for determining a chemical intake capacity of a process medium relative to an analyte in a measuring point, wherein the method comprises at least the following steps:

providing the measuring point through which the process medium flows and an analytical measuring device, wherein the measuring point has an inlet valve, an outlet valve, an analysis container, a dosing container and a pump, wherein the inlet valve is connected to a first inlet, a second inlet, the analysis container and the dosing container, wherein the first inlet is configured to feed in the process medium, wherein the second inlet is configured to feed in the analyte, wherein the outlet valve is connected to a drain, the analysis container and the dosing container, wherein the inlet valve, the analysis container, the dosing container and the outlet valve are connected to one another in such a way that a flow circuit can be realized in the measuring point, wherein the pump is arranged in such a way that it is suitable for generating the flow circuit, wherein the analytical measuring device is arranged in the analysis container and is in contact with the process medium, closing the outlet valve, so that no process medium is discharged through the outlet valve to the drain, closing the inlet valve so that no additional process medium is fed from the first inlet into the measuring point and a predetermined volume of process medium is located in the measuring point, measuring a first measured value of a first measurand of the process medium using the analytical measuring device, feeding a predetermined volume of the analyte into the measuring point through the inlet valve from the second inlet, circulating the analyte and the process medium through the pump, so that the flow circuit is generated and an analyte process medium mixture flows into the analytical measuring device, wherein a predetermined flow velocity of the analyte process medium mixture is set by the pump, measuring a second measured value of a second measurand of the analyte process medium mixture using the analytical measuring device, comparing the first measured value of the first measurand with the second measured value of the second measurand, repeating the steps of feeding, circulating, measuring and comparing while the second measured value of the second measurand does not exceed the first measured value of the first measurand and until the second measured value of the second measurand is equal to or exceeds the first measured value of the first measurand;

summing the fed-in predetermined volumes to form a total volume of the analyte fed into the measuring point; and determining the chemical intake capacity of the process medium based on the total volume of the analyte fed into the measuring point.

2. The method according to claim 1, wherein the first measured value and the second measured value are a disinfectant content and the analytical measuring device is a disinfection sensor.

3. The method according to claim 1, wherein the first measured value of the first measurand and the second measured value of the second measurand are a depletion rate of a disinfectant.

4. The method according to claim 3, wherein there is a time interval between the measurement of the first measured value of the first measurand and the second measured value of the second measurand of less than 10 minutes.

5. The method according to claim 4, wherein the steps of feeding, circulating and measuring the first measured value of the first measurand occur during a time interval of less than one minute.

6. A measuring point for determining a chemical intake capacity of a process medium, wherein the chemical intake capacity of the process medium is determined according to claim 1, comprising:

an inlet valve, an outlet valve, an analysis container, a dosing container and a pump with a regulatable delivery rate, wherein the inlet valve is connected to a first inlet, a second inlet, the analysis container and the dosing container, wherein the inlet valve is configured to feed in the process medium, wherein the second inlet is configured to feed in an analyte, wherein the outlet valve is connected to a drain, the analysis container and the dosing container, wherein the inlet valve, the analysis container, the dosing container and the outlet valve are connected to one another in such a way that a flow circuit can be realized in the measuring point, wherein the pump is arranged in such a way that it is suitable for generating the flow circuit, wherein an analytical measuring device is arranged in the analysis container in such a way that the flow circuit provides flow of an analyte process medium mixture to the analytical measuring device;

wherein the measuring point is configured to repeat steps of feeding, circulating, measuring and comparing while the a second measured value of a second measurand does not exceed a first measured value of a first measurand and until the second measured value of the second measurand is equal to or exceeds the first measured value of the first measurand wherein the measuring point further comprises a bypass channel which connects the first inlet and the drain in order to guide a part of the process medium from the first inlet past the analysis container and the dosing container to the drain, wherein a first turbine of the pump is arranged in the bypass channel and a second turbine of the pump is arranged in the flow circuit, wherein the first turbine is suitable for driving the second turbine.

7. The measuring point according to claim 6, wherein the inlet valve is configured as a multi-way valve.

8. The measuring point according to claim 7, wherein the analytical measuring device is an electrochemical chlorine sensor, electrochemical chlorine dioxide sensor, bromine sensor, a pH sensor, a conductivity sensor or a dissolved oxygen sensor.

9. A method for determining a chemical intake capacity of a process medium relative to an analyte in a measuring point, wherein the method comprises at least the following steps:

providing the measuring point through which the process medium flows and an analytical measuring device, wherein the measuring point has an inlet valve, an outlet valve, an analysis container, a dosing container and a pump, wherein the inlet valve is connected to a first inlet, a second inlet, the analysis container and the dosing container, wherein the first inlet is configured to feed in the process medium, wherein the second inlet is configured to feed in the analyte, wherein the outlet valve is connected to a drain, the analysis container and the dosing container, wherein the inlet valve, the analysis container, the dosing container and the outlet valve are connected to one another in such a way that a flow circuit can be realized in the measuring point, wherein the pump is arranged in such a way that it is suitable for generating the flow circuit, wherein the analytical measuring device is arranged in the analysis container and is in contact with the process medium, closing the outlet valve, so that no process medium is discharged through the outlet valve to the drain, closing the inlet valve so that no additional process medium is fed from the first inlet into the measuring point and a predetermined volume of process medium is located in the measuring point, measuring a first measured value of a first measurand of the process medium using the analytical measuring device, feeding a predetermined volume of the analyte into the measuring point through the inlet valve from the second inlet, circulating the analyte and the process medium through the pump, so that the flow circuit is generated and an analyte process medium mixture flows into the analytical measuring device, wherein a predetermined flow velocity of the analyte process medium mixture is set by the pump, measuring a second measured value of a second measurand of the analyte process medium mixture using the analytical measuring device, comparing the first measured value with the second measured value, repeating the steps of feeding circulating, measuring and comparing while the second measured value does not exceed the first measured value and until the second measured value is equal to or exceeds the first measured value;

summing the fed-in predetermined volumes to form a total volume of the analyte fed into the measuring point; and determining the chemical intake capacity of the process medium based on the total volume of the analyte fed into the measuring point;

calculating a disinfectant requirement based on the sum of the fed-in volumes of disinfectant and a total volume of process medium or a volumetric flow of process medium, opening the inlet valve and the outlet valve;

feeding the calculated amount of disinfectant into the measuring point through the inlet valve from the second inlet while the process medium flows from the first inlet through the measuring point to the drain.

\* \* \* \* \*